(12) United States Patent
Marcon et al.

(10) Patent No.: US 9,337,554 B2
(45) Date of Patent: May 10, 2016

(54) INSERT OF ELECTRICALLY CONDUCTING MATERIAL, AND TOOL AND METHOD FOR FITTING SUCH AN INSERT TO A SUPPORTING MEMBER (71) Applicant: AGUSTAWESTLAND S.p.A., Samarate (IT)

(72) Inventors: Tiziano Marcon, Samarate (IT); Flavio Baroli, Samarate (IT); Luigi Bezzon, Samarate (IT); Roberto Gussoni, Samarate (IT); Enrico Puricelli, Samarate (IT); Simone Sotgiu, Samarate (IT)

(73) Assignee: AGUSTAWESTLAND S.P.A., Samarate (IT)

( * ) Notice: Subject to any disclaimer, the term of this patent is extended or adjusted under 35 U.S.C. 154(b) by 224 days.

(21) Appl. No.: 14/365,522

(22) PCT Filed: Oct. 11, 2012

(86) PCT No.: PCT/IB2012/055525
§ 371 (c)(1),
(2) Date: Jun. 13, 2014

(87) PCT Pub. No.: WO2013/098666
PCT Pub. Date: Jul. 4, 2013

(65) Prior Publication Data
US 2015/0004851 A1 Jan. 1, 2015

(30) Foreign Application Priority Data

Dec. 30, 2011 (EP) .................................... 11425315

(51) Int. Cl.
H01R 4/66 (2006.01)
H01R 4/30 (2006.01)
F16B 5/01 (2006.01)
H01R 13/622 (2006.01)
F16B 1/00 (2006.01)

(52) U.S. Cl.
CPC  *H01R 4/304* (2013.01); *F16B 5/01* (2013.01); *H01R 4/30* (2013.01); *H01R 13/622* (2013.01); *F16B 2001/0064* (2013.01); *Y10T 29/49117* (2015.01); *Y10T 29/5313* (2015.01)

(58) Field of Classification Search
CPC ........ H01R 4/30; H01R 4/304; H01R 9/0512; H01R 13/622; H01R 13/748; Y10T 29/5313; Y10T 29/49117; F16B 5/01; F16B 2001/0064
USPC ............. 439/801, 97, 564, 565, 573; 361/799
See application file for complete search history.

(56) References Cited

U.S. PATENT DOCUMENTS 2,704,357 A * 3/1955 Johnson ................. H01R 24/76
174/151
3,861,774 A * 1/1975 Willis ................... F16B 37/068
29/511

(Continued)

FOREIGN PATENT DOCUMENTS

GB          2 480 230        11/2011

*Primary Examiner* — Neil Abrams
*Assistant Examiner* — Travis Chambers
(74) *Attorney, Agent, or Firm* — Leason Ellis LLP (57) ABSTRACT An insert made of electrically conducting material, insertable at least partly inside a seat on a first member, and connectable to a second member; the insert having a fastening member connectable electrically to a first electrically conducting area on the first member.

13 Claims, 6 Drawing Sheets

(56) References Cited

U.S. PATENT DOCUMENTS

| | | | | |
|---|---|---|---|---|
| 4,673,240 A * | 6/1987 | Byfield, Jr. | ............ | H01M 2/305 411/378 |
| 5,021,013 A * | 6/1991 | Wiesler | ................ | H01R 11/289 439/754 |
| 5,442,133 A * | 8/1995 | Arnold | ............... | B23K 35/0288 174/51 |
| 5,445,861 A | 8/1995 | Newton et al. | | |
| 7,049,970 B2 * | 5/2006 | Allen | ................... | G08B 13/126 340/568.2 |
| 7,128,017 B2 * | 10/2006 | Guarino | ............... | H01R 13/521 114/312 |
| 7,290,334 B2 * | 11/2007 | Pettersen | ............. | F16B 5/0258 29/825 |
| 7,651,345 B2 * | 1/2010 | Tomioka | .............. | H01Q 1/2258 439/573 |
| 7,713,071 B2 * | 5/2010 | Pearce | ................... | H01R 4/302 439/97 |
| 8,206,186 B2 * | 6/2012 | Kisic | .................... | G01R 1/0408 439/482 |
| 8,436,243 B2 * | 5/2013 | Gattus | ................... | H02G 13/00 174/2 |
| 2002/0050105 A1 | 5/2002 | McCorkle et al. | | |
| 2013/0303013 A1 * | 11/2013 | Bengtsson | ............... | H01R 4/30 439/345 |

* cited by examiner

INSERT OF ELECTRICALLY CONDUCTING MATERIAL, AND TOOL AND METHOD FOR FITTING SUCH AN INSERT TO A SUPPORTING MEMBER

CROSS REFERENCE TO RELATED APPLICATIONS

The present application is a U.S. National Phase of International Patent Application PCT/IB2012/055525, filed Oct. 11, 2012, which claims priority to European Patent Application No. 11425315.6, filed Dec. 30, 2011, each of which is incorporated herein by reference in its entirety.

TECHNICAL FIELD

The present invention relates to an insert of electrically conducting material.

The present invention also relates to a tool for fitting an insert of electrically conducting material to a supporting member.

The present invention also relates to a method of fitting an insert of electrically conducting material to a supporting member.

BACKGROUND ART

In the aircraft industry in particular, equipment, such as electric and avionic equipment, is known to be connected mechanically to supporting structures, in particular honeycomb panels.

Such equipment is also connected electrically to the supporting structures, which are considered equipotential ground surfaces.

More specifically, the equipment is connected electrically to the supporting structures so that the electric contact resistance between them does not exceed 2.5 mΩ, as required by current regulations.

This protects people from electric discharges both on the ground and in flight, prevents the formation of fire-hazardous electric arcs, prevents the formation of electrostatic charges capable of causing interference, and ensures effective equipment insulation.

In the aircraft industry, the supporting structure is usually a honeycomb panel bounded on the top and bottom by two conducting metal, e.g. aluminium, sheets.

The metal sheets are normally coated with electrically insulating material.

The equipment is connected mechanically to the panel by a number of inserts.

More specifically, each insert substantially comprises a head housed loosely inside a through hole in the top sheet of the panel; and a stem housed loosely inside a seat in the panel.

The insert heads are connected to respective fastening portions of the equipment.

Known inserts therefore only provide for connecting the equipment mechanically to the supporting structure, and are insulated electrically from the supporting structure by there being no electric contact between conducting parts of the sheet and conducting parts of the inserts.

The equipment is connected electrically to the supporting structure by forming conducting areas on the top sheet of the panel, i.e. areas around respective anchoring portions of the equipment resting on the top sheet of the panel.

The conducting areas are formed by first removing the insulation coating from the areas of the top sheet surrounding the anchoring portions, and then protecting the areas with conductive corrosionproofing material.

Alternatively, outer surface areas of the sheet surrounding the anchoring portions may be left uncoated and protected with conductive corrosionproofing material.

Electric connection of the equipment to the supporting structure can therefore only be tested after the equipment is fixed to the insert and connected electrically to the sheet on the panel by the anchoring portions.

A need is felt within the industry to enable electric connection of the equipment to the supporting structure to be tested when fitting the insert.

In the case of equipment anchoring portions in the form of a flat surface resting on the top sheet, a large area of the insulation coating, equal to the area of the anchoring portions, must be removed from the top sheet.

Removing the insulation coating from the top sheet of the supporting structure also results in the formation of a step on the top sheet.

In the case of equipment anchoring portions in the form of a flat surface resting on the top sheet, the step formed may interrupt electric connection between the equipment and the supporting structure.

The above known solution therefore only ensures electric connection between the equipment and the supporting structure when the anchoring portions of the equipment are in the form of feet projecting from the underside surface of the equipment.

A need is felt within the industry to ensure electric conductivity of the mechanical connection between the equipment and supporting structure, and to reduce or even eliminate removal of the insulation coating from the supporting structure sheet, to enable easier, faster connection of the equipment to the supporting structure.

DISCLOSURE OF INVENTION

It is an object of the present invention to provide an insert designed to meet at least one of the above requirements cheaply and easily.

According to the present invention, there is provided an insert made of electrically conducting material, insertable at least partly inside a seat on a first member, and connectable to a second member;

said insert being characterized by comprising a fastening member connectable electrically to a first electrically conducting area on said first member.

The present invention also relates to a tool for fitting an insert to a supporting member, and characterized by comprising:

a first body connectable to said insert; and a second body defining a reference surface designed to cooperate, in use, with said supporting member to set a first axis of said insert to a given position with respect to said supporting member before fitting said insert;

said first body being movable along a second axis with respect to said second body to insert said insert inside a seat on said supporting member.

The present invention also relates to a method of fitting an insert of electrically conducting material to a supporting member, characterized by comprising the steps of:

inserting the insert at least partly inside a seat formed in said supporting member; and electrically connecting said insert to a first electrically conducting area of said supporting member.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

With reference to FIGS. 4-8, number 1 (FIG. 8) indicates a piece of equipment, and number 2 a supporting structure for supporting equipment 1.

Equipment 1 and supporting structure 2 preferably form part of an aircraft, in particular a helicopter.

For a clear understanding of the present invention, supporting structure 2 is comparable to an electrically 15, equipotential surface.

In the example shown, equipment 1 is avionic equipment.

Supporting structure 2 substantially comprises:
a honeycomb panel 3 of electrically insulating material; and
two metal sheets 4 (only one shown) of electrically conducting material—in the example shown, aluminium.

Sheets 4 are positioned parallel to each other, on opposite sides of panel 3, respectively define the top and bottom of panel 3, and are coated on the top and bottom respectively with coatings 6 of electrically insulating material (the bottom coating not shown).

Supporting structure 2 and equipment 1 are connected mechanically and electrically to each other by a number of inserts 10 inserted inside respective seats 8 in supporting structure 2 and connected mechanically to respective portions of equipment 1.

Inserts 10 being identical, the following description refers to one insert 10 and corresponding seat 8.

Insert 10 is made of conducting material, such as aluminium or steel.

Insert 10 advantageously comprises a fastening member 11 connectable electrically to a surface 7 of sheet 4 of panel 3 (FIGS. 1-8).

More specifically, surface 7 bounds seat 8 in sheet 4, and defines a first electrically conducting area of supporting structure 2, connected electrically to insert 10.

More specifically, fastening member 11 is a thread 12 which screws inside surface 7 of supporting structure 2.

More specifically, thread 12 is self-threading.

Insert 10 extends along an axis A, and substantially comprise (FIG. 1):
a flange 15 defining a surface 16 for securing equipment 1, and a surface 17 opposite surface 16 and which cooperates with supporting structure 2;
a stem 14 projecting inwards of seat 8 from flange 15; and
an annular projection 18 interposed axially between flange 15 and stem 14.

Flange 15 defines a first axial end of insert 10.

Surface 17 preferably cooperates with an area 9 (FIGS. 4-8) of sheet 4, from which coating 6 has been removed.

Surface 17 thus defines a second electrically conducting area between insert 10 and supporting structure 2.

Figure 8:
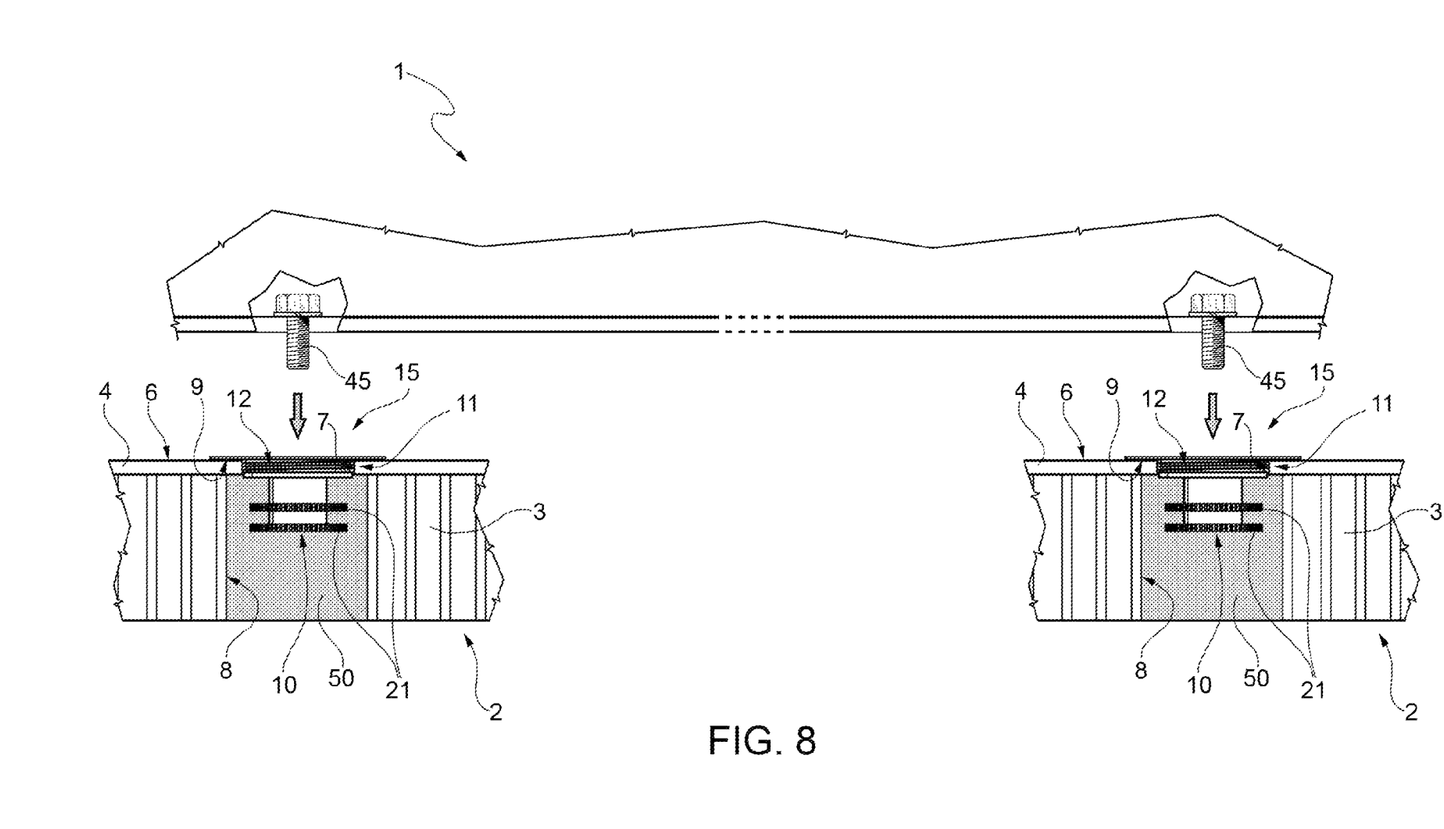

Flange 15 has a threaded hole 25 extending along axis A, and which is engaged by a screw 45 for securing equipment 1 (FIG. 8).

Flange 15 also comprises two holes 26 extending along respective axes C parallel to axis A.

Holes 26 are smaller in diameter than hole 25, and respective axes C are spaced 180° apart with respect to axis A.

Holes 26 serve to pour adhesive 50 (FIGS. 7 and 8) into insert 10, once the insert is fitted inside seat 8.

Adhesive 50 subsequently flows out of insert 10, in a manner not shown, to fill seat 8 and secure insert 10 and seat 8 integrally to each other (FIG. 8).

Holes 26 are also engaged by a tool 30 (FIGS. 2-6) for fitting insert 10 as described below.

Projection 18 is smaller in diameter than flange 15 and larger in diameter than stem 14.

Starting from surface 17 and working towards stem 14, parallel to axis A, projection 18 comprises:
a first portion 19 adjacent to surface 17 of flange 15 and on which thread 12 is formed; and
a second portion 20 interposed between surface 17 and stem 14.

Stem 14 comprises two parallel toothed flanges 21 perpendicular to axis A.

Flanges 21 are spaced axially apart, and one of them defines a second axial end, opposite flange 15, of insert 10.

With reference to FIGS. 2-6, number 30 indicates a tool for inserting insert 10 inside seat 8 in supporting structure 2.

Tool 30 advantageously comprises:
a body 31 connectable to insert 10; and
a body 32 defining a reference surface 28 which cooperates with coating 6 on sheet 4 to orient insert 10 with respect to supporting structure 2. Body 31 is movable along axis B with respect to body 32 to insert insert 10 inside seat 8.

More specifically, tool 30 extends along axis B, which coincides with axis A once body 31 is connected to insert 10.

At opposite axial ends, body 31 comprises a grip 33; and a flange 34 with two pins 35, which project from the opposite side to grip 33 and engage holes 26 when fitting insert 10.

Body 31 also comprises a threaded portion 36 interposed axially between grip 33 and flange 34.

More specifically, portion 36 is threaded externally with respect to axis B.

Body 32 is a cylinder, of axis B, which is larger in diameter and shorter in height than body 31.

More specifically, body 32 is bounded axially by surface 28, and by an axially opposite surface 29.

Surfaces 28 and 29 are flat, parallel to each other, and perpendicular to axis B.

Body 32 surrounds portion 36, and comprises a nut screw 40, which engages the thread on portion 36 (FIG. 3), so that rotation of body 31 about axis B moves body 31 along axis B with respect to body 32.

Insertion of insert 10 will now be described as of the condition in which pins 35 on tool 30 are inserted inside holes 26 in flange 15 of insert 10 (FIG. 5), so that axes A and B coincide, and pins 35 extend parallel to respective axes C.

Figure 1:
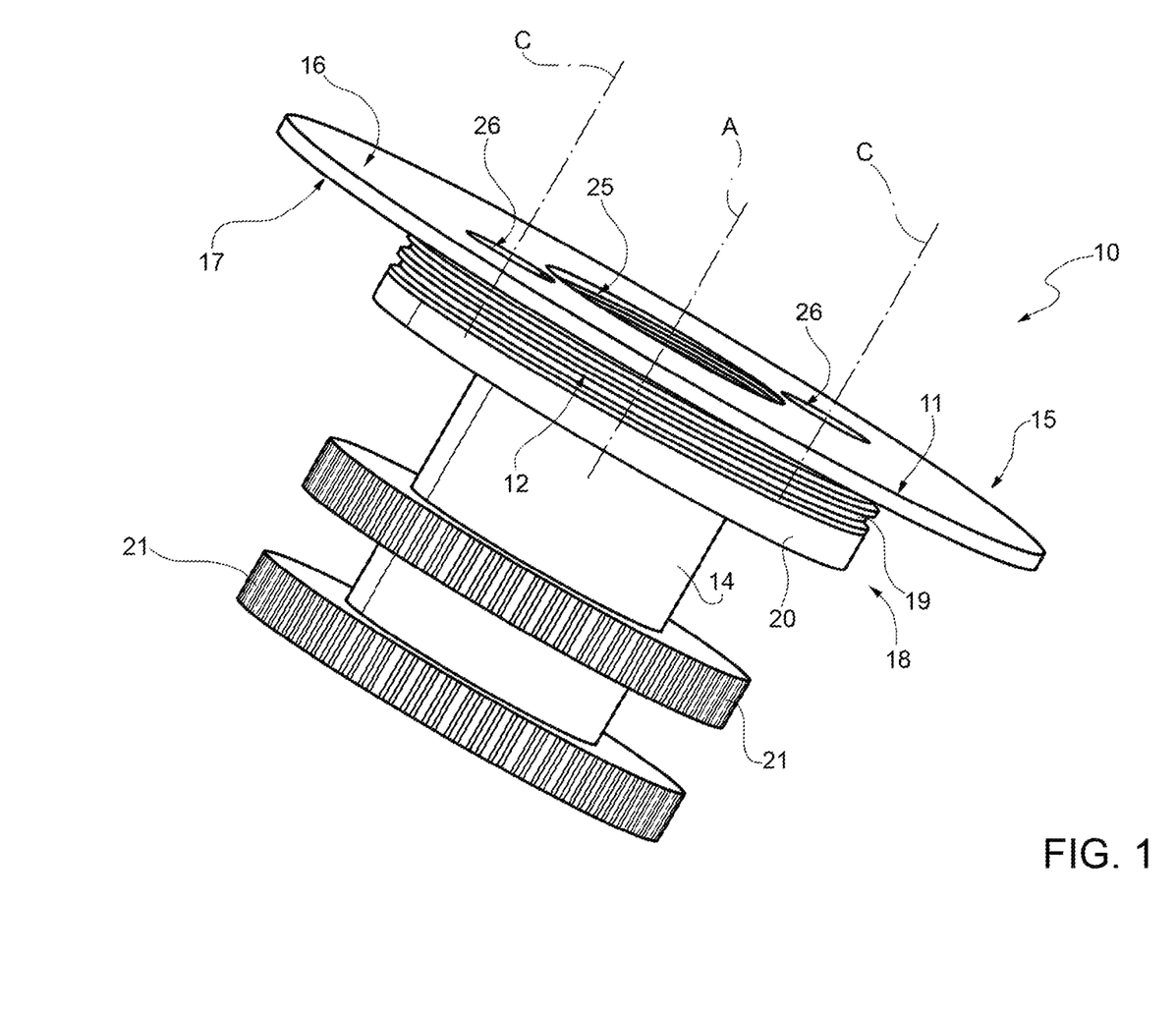
FIG. 1 shows a view in perspective of an insert in accordance with the teachings of the present invention.
Figure 2:
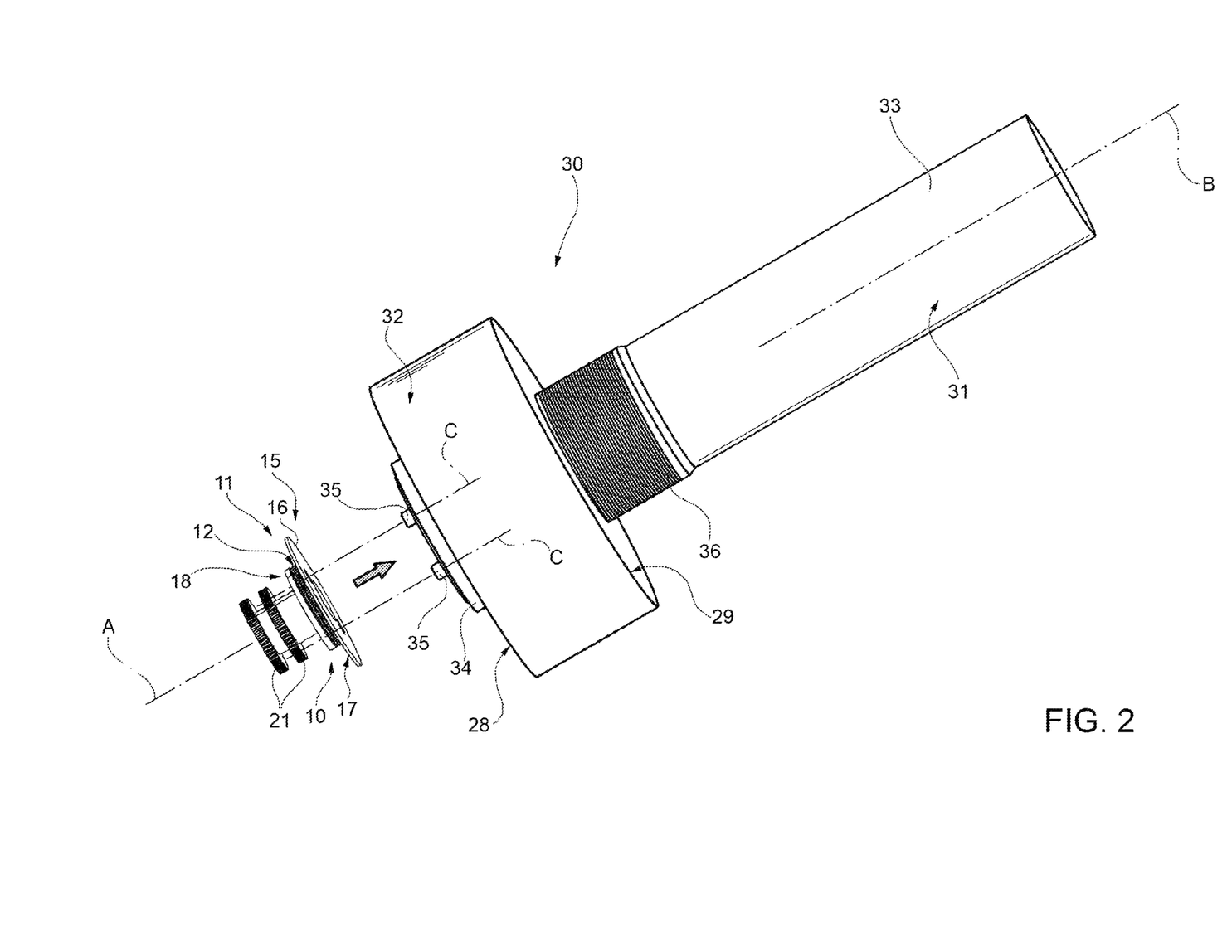
FIG. 2 shows a view in perspective of a tool for fitting the FIG. 1 insert to a supporting structure.
Figure 3:
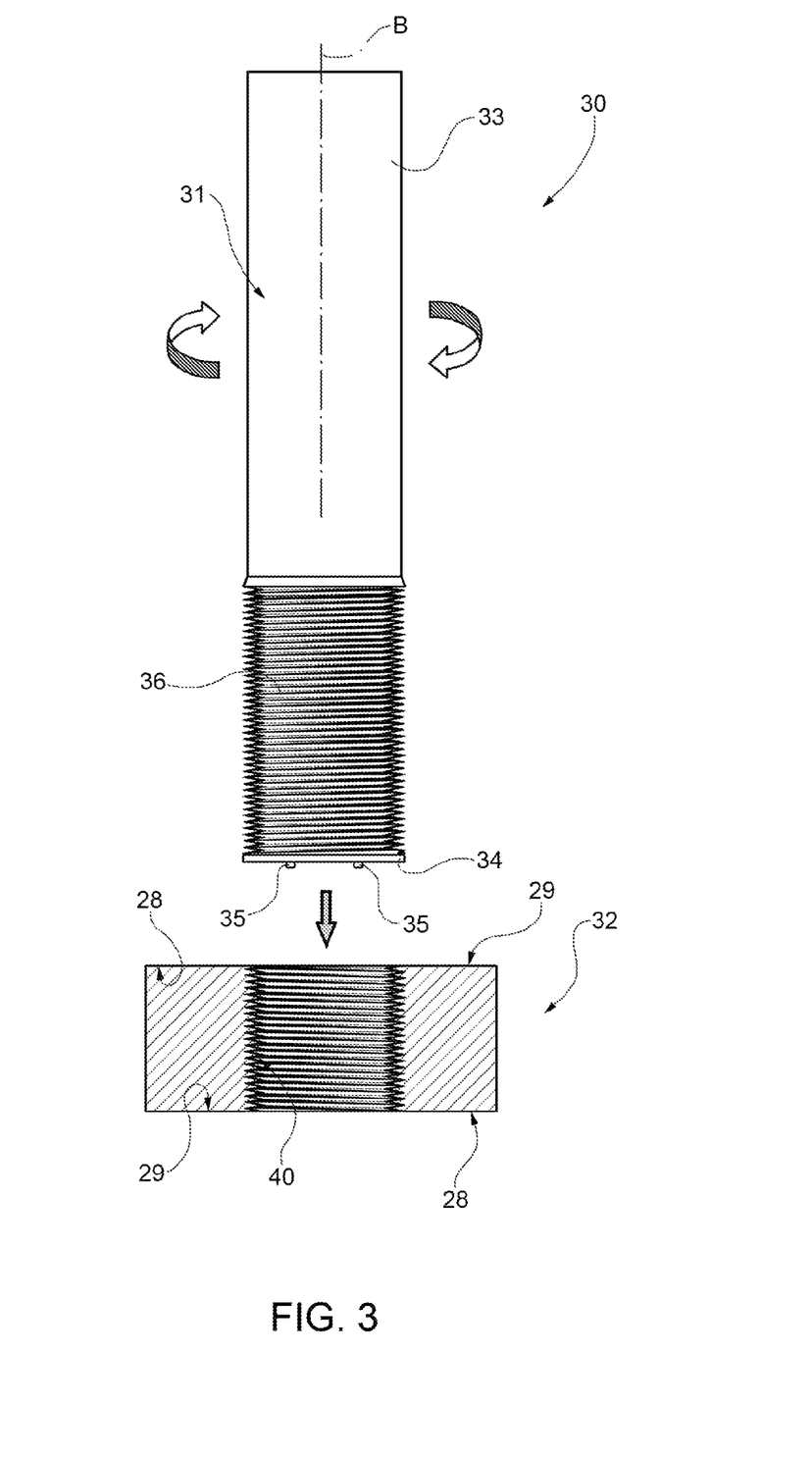
FIG. 3 shows an exploded view of the FIG. 2 tool.
Figure 4:
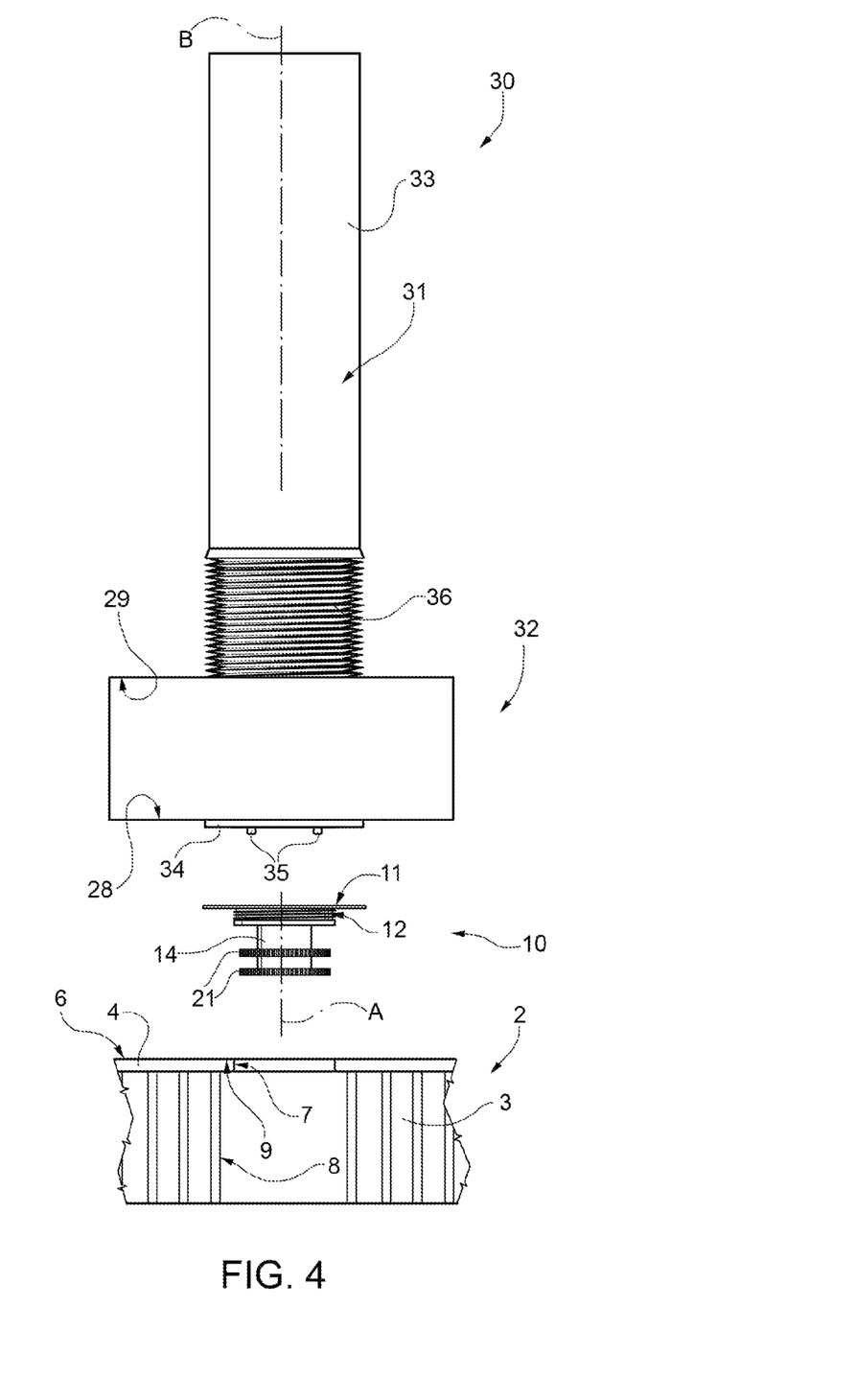
FIGS. 4-8 show successive steps in fitting the FIG. 1 insert to a supporting structure.
Figure 5:
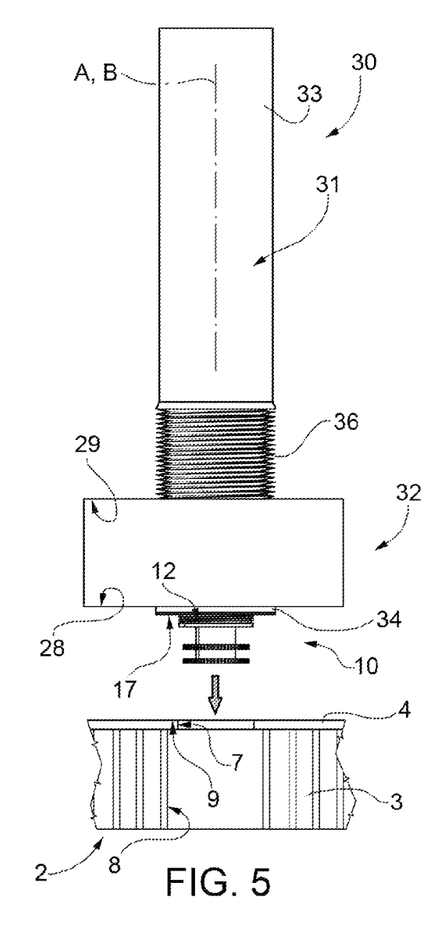
Figure 6:
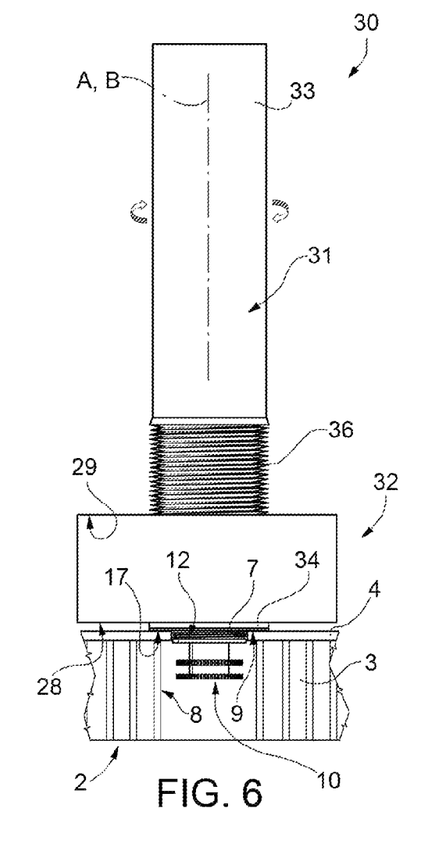

At this point, surface 28 is placed on coating 6 of sheet 4 (FIG. 6).

This ensures axis A of insert 10 is perpendicular to the plane of panel 3.

Body 31 is then rotated about axis B with respect to body 32.

Given the threaded connection between portion 36 and nut screw 40 of body 32, body 31 moves along axis B towards seat 8 as it rotates about axis B.

The movement of body 31 along axis B brings surface 17 of flange 15 to rest on area 9 of sheet 4, and at the same time positions thread 12 of stem 14 of insert 10 inside seat 8.

Rotation of body 31 about axis B also rotates thread 12, thus screwing thread 12 inside supporting structure 2 (FIG. 6).

Thread 12 thus screws inside surface 7 of sheet 4 to form a first electric contact between insert 10 and supporting structure 2; and surface 17 and area 9 of sheet 4 form a second electric contact between insert 10 and supporting structure 2.

Insert 10 at this point is therefore connected electrically and prefixed to supporting structure 2.

Figure 7:
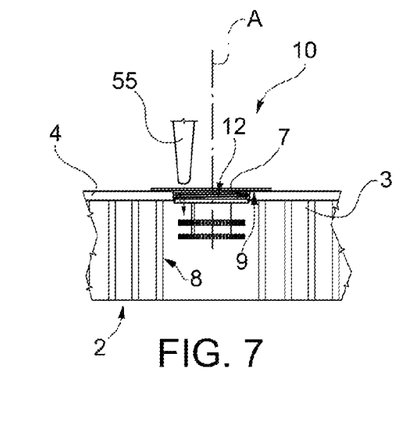

Pins 35 are now removed from holes 26, and tool 30 detached from insert 10 (FIG. 7).

Adhesive 50 is injected through holes 26 in insert 10 using a nozzle 55.

Adhesive 50 flows out of insert 10 through a hole (not shown) to fill seat 8 (FIG. 8).

Installation of insert 10 inside supporting structure 2 is now complete.

Once a number of inserts 10 are fitted inside respective seats 8 in supporting structure 2, equipment 1 is connected by means of a number of screws 45 screwed inside respective holes 25 in respective flanges 15.

Screws 45, holes 25, and inserts 10 thus form a further electric contact between equipment 1 and supporting structure 2.

Inserts 10 thus connect equipment 1 both mechanically and electrically to supporting structure 2.

It is important to bear in mind that coating 6 need not necessarily be removed from area 9. In which case, equipment 1 is connected electrically to supporting structure 2 solely by thread 12 engaging surface 7.

The advantages of insert 10, tool 30, and the method according to the present invention will be clear from the above description.

In particular, insert 10 is connected electrically to supporting structure 2 by thread 12 engaging surface 7 of sheet 4.

Which means insert 10 may first be connected electrically to supporting structure 2, and equipment 1 then connected mechanically to insert 10.

The electric connection of equipment 1 to supporting structure 2 may therefore be tested before connecting equipment 1 mechanically to insert 10, by simply testing the electric connection between insert 10 and supporting structure 2.

Testing can thus be carried out easily and at any time to determine whether the electric contact resistance between supporting structure 2 and equipment 1, still to be connected to insert 10, exceeds the minimum design threshold.

Fastening member 11 being connected electrically to surface 7 of sheet 4, coating 6 need not be removed from area 9 of sheet 4 to form an electric connection between equipment 1 and supporting structure 2.

This therefore makes electric connection of equipment 1 to supporting structure 2 much easier, cheaper and faster, avoids any risk of damage to sheet 4 when removing coating 6, and also eliminates any repair work to coating 6 in the areas left exposed by flange 15.

Electric connection being established solely by thread 12 being connected electrically to surface 7, the diameter of flange 15 may be reduced, thus reducing the height of insert 10.

Moreover, supporting structure 2 may be connected electrically to equipment 1 with feet or flat surfaces resting on coating 6.

Even opting for a further electric contact between flange 15 of insert 10 and area 9 of sheet 4 by removing part of coating 6, the present invention still affords advantages with respect to the known solutions described in the introduction.

In fact, in this case, coating 6 need only be stripped from the area 9 of sheet 4 beneath surface 17 of flange 15, which is obviously much smaller than the sheet area to be stripped in known solutions, which call for removing a coating area at least equal to the area of the equipment anchoring portion.

In this connection, the Applicant has observed that, whether or not coating 6 is removed from area 9, the electric contact resistance between insert 10 and supporting structure 2 is below the minimum design and regulation threshold for these applications.

The mechanical connection between fastening member 11 and surface 7 also allows effective locking of insert with respect to supporting structure 2 before injecting adhesive 50.

Screws 45, holes 25, and the bodies of inserts 10 form a further, highly stable, durable electrically conducting area between equipment 1 and supporting structure 2.

By moving body 31 along axis B with respect to body 32, and positioning surface 28 on coating 6 or sheet 4, tool 30 provides for positioning axis A of insert 10 correctly with respect to supporting structure 2 before inserting insert 10 inside seat 8.

By virtue of nut screw 40 engaging the thread on portion 36, insert 10 moves along and rotates about axis A simultaneously.

This rotation of insert 10 screws thread 12 correctly onto surface 7.

Clearly, changes may be made to insert 10, tool 30 and the method as described herein without, however, departing from the protective scope of the present invention.

In particular, insert 10 may be fitted through supporting structure 2.

Fastening member 11 may be knurling.

And thread 12 may be formed on portion 19 as opposed to portion 20.

The invention claimed is:

1. An insert (10) made of electrically conducting material, insertable at least partly inside a seat (8) on a first member (2), and connectable to a second member (1), so as to mechanically and electrically connect said first member (2) and said second member (1);

said insert (10) comprising:

a fastening member (11) connectable electrically to a first electrically conducting area (4, 7) on said first member (2);

a supporting surface (17) connectable mechanically to said second member (1);

characterized in that said supporting surface (17) is electrically connectable to a second electrically conducting area (9) of said first member (2);

said insert (10) further comprising:

a first flange (15) defining said supporting (17), which cooperates with said first member (2); and a stem (14) projecting from said supporting surface (17) and insertable inside said seat (8);

said fastening member (11) being interposed between said first flange (15) and said stem (14);

said fastening member (11) comprising at least one thread (12) which screws onto said first electrically conducting area (4, 7).

2. An insert as claimed in claim 1, characterized in that said first flange (15) comprises at least one opening (26) by which to pour adhesive into said insert (10) and/or for connection to a fitting tool (30).

3. An insert as claimed in claim 1, characterized in that said first flange (15) comprises fastening means (25) engaged by said second member (1).

4. An assembly comprising:
said first member (2);
said second member (1); and
an insert (10) as claimed in claim 1;
said first member (2) comprising a panel (3) defining at least one said seat (8); and at least one body (4) defining said first and second electrically conducting area (4, 7);
said insert (10) and said first member (2) being connected mechanically to each other by connecting means (25, 35) made of electrically conducting material and defining a further electrically conducting area between said first and second members (2, 1).

5. An insert as claimed in claim 1, characterized by comprising an annular projection (18) interposed axially between said flange (15) and said stem (14).

6. An insert as claimed in claim 1, characterized in that said projection (18) comprises, proceeding from said first surface (17) towards said stem (14):
a first portion (19) adjacent to said supporting surface (17) of said flange (15) and on which said fastening means (11) are formed; and
a second portion (20) interposed between said first portion (19) and said stem (14).

7. An insert as claimed in claim 1, characterized in that said stem (14) comprises two parallel toothed second flanges (21) perpendicular to an axis (A) of said stem (14); one of said flanges (21) defining an axial end, opposite to said first flange (15), of said insert (10).

8. An insert as claimed in claim 1, characterized in that thread (12) is self-threading.

9. A tool (30) for fitting an insert (10) as claimed in claim 1 to a supporting member (2), comprising:
a first body (31) connectable to said insert (10); and
a second body (32) defining a reference surface (28) designed to cooperate, in use, with said supporting member (2) to set a first axis (A) of said insert (10) to a given position with respect to said supporting member (2) before fitting said insert (10);
said first body (31) being movable along a second axis (B) with respect to said second body (32) to insert said insert (10) inside a seat (8) on said supporting member (2);
characterized in that said first body (31) rotates about said second axis (B) with respect to said second body (32) to screw a thread (12) on said insert (10) to an electrically conducting area (4, 7) of said supporting member (2).

10. A tool as claimed in claim 9, characterized in that said first and second body (31, 32) comprise respective meshing threads (36, 40).

11. A method of fitting an insert (10) of electrically conducting material to a first supporting member (2), so as to mechanically and electrically connect said first supporting member (2) and a second member (1), comprising the steps of:
inserting the insert (10) at least partly inside a seat (8) formed in said first supporting member (2);
mechanically connecting a supporting surface (17) of said insert (10) to said second member (1);
characterized by comprising the steps of
electrically connecting a fastening member (11) of said insert (10) to a first electrically conducting area (4, 7) of said first supporting member (2);
positioning a surface (17) of said insert (10) on a second electrically conducting area (9) of said first supporting member (2);
contacting said first supporting member (2) with a flange (15), which defines said supporting surface (17); and
inserting a stem (14) projecting from said supporting surface (17) inside said seat (8);
said fastening member (11) being interposed between said flange (15) and said stem (14);
said mechanically connecting step comprising the step of screwing a thread (12) on said insert (10) to said first electrically conducting area (4, 7) of said first supporting member (2).

12. A method as claimed in claim 11, characterized in that said inserting step comprises the step of first securing said insert (10) with respect to said first supporting member (2); and by comprising, after said connecting step, the step of gluing said insert (10) inside said seat (8) in said first supporting member (2) to fix said insert (10) definitively to said first supporting member (2).

13. A method as claimed in claim 11, characterized by comprising the step of positioning a surface (28) of a fitting tool (30) on said first supporting member (2) to set an axis (A) of said insert (10) to a given position with respect to said first supporting member (2).

* * * * *